(12) United States Patent
Niedermayer

(10) Patent No.: US 11,877,379 B2
(45) Date of Patent: Jan. 16, 2024

(54) APPARATUS AND METHOD FOR GUIDING CHARGED PARTICLES

(71) Applicant: Technische Universität Darmstadt, Darmstadt (DE)

(72) Inventor: Uwe Niedermayer, Darmstadt (DE)

(73) Assignee: Technische Universität Darmstadt, Darmstadt (DE)

( * ) Notice: Subject to any disclaimer, the term of this patent is extended or adjusted under 35 U.S.C. 154(b) by 205 days.

(21) Appl. No.: 17/385,270

(22) Filed: Jul. 26, 2021

(65) Prior Publication Data
US 2022/0039247 A1 Feb. 3, 2022

(30) Foreign Application Priority Data

Jul. 28, 2020 (DE) .......................... 102020119875.2

(51) Int. Cl.
| | | |
|---|---|---|
| H05H 9/04 | (2006.01) | |
| H05H 15/00 | (2006.01) | |
| H01S 3/09 | (2006.01) | |
| H05H 7/06 | (2006.01) | |
| H05H 7/22 | (2006.01) | |

(52) U.S. Cl.
CPC ............ *H05H 9/04* (2013.01); *H01S 3/0903* (2013.01); *H05H 7/06* (2013.01); *H05H 15/00* (2013.01); *H05H 2007/222* (2013.01)

(58) Field of Classification Search
None
See application file for complete search history.

(56) References Cited

U.S. PATENT DOCUMENTS

| | | | | |
|---|---|---|---|---|
| 4,211,954 A | * | 7/1980 | Swenson ................. | H01J 23/20 315/5.41 |
| 4,350,927 A | * | 9/1982 | Maschke ................. | H05H 9/00 330/4.7 |
| 4,392,080 A | * | 7/1983 | Maschke ................. | H05H 9/00 315/5 |

(Continued)

FOREIGN PATENT DOCUMENTS

| | | |
|---|---|---|
| CA | 2681824 A1 | 12/2008 |
| DE | 102015116788 | 12/2016 |

(Continued)

*Primary Examiner* — Srinivas Sathiraju
(74) *Attorney, Agent, or Firm* — Haukaas Fortius PLLC; Michael Haukaas

(57) ABSTRACT

An apparatus for guiding, in particular directing or accelerating, charged particles (50), comprising: a substrate (110) having a surface (115); an optically thinner layer (120) formed on the surface (115); an inhomogeneous channel (130) which is formed by two mutually opposite delimiting structures on a side of the layer (120) that is opposite the substrate (110); and a radiation device which is designed to generate at least one pulsed laser beam (140) and inject the at least one pulsed laser beam (140) into the channel (130) from a side that is opposite the optically thinner layer (120). The layer (120) for the laser beam (140) is optically thin, and the delimiting structures have a high optical density in comparison with the layer (120). The delimiting structures are designed to guide the particles (50) by means of the laser beam (140) in the channel (130) and alternatingly focus them along the channel (130) and in at least one direction perpendicular to the channel (130).

12 Claims, 7 Drawing Sheets

(56) References Cited

U.S. PATENT DOCUMENTS

| | | | | |
|---|---|---|---|---|
| 4,596,946 A * | 6/1986 | Pottier | | H05H 9/04 |
| | | | | 315/5.52 |
| 4,639,641 A * | 1/1987 | Tronc | | H05H 7/18 |
| | | | | 315/5.41 |
| 4,667,111 A * | 5/1987 | Glavish | | H01J 37/3171 |
| | | | | 315/505 |
| 5,014,014 A * | 5/1991 | Swenson | | H01J 23/24 |
| | | | | 315/505 |
| 5,084,682 A * | 1/1992 | Swenson | | H05H 7/02 |
| | | | | 315/505 |
| 5,113,141 A * | 5/1992 | Swenson | | H05H 9/00 |
| | | | | 315/505 |
| 5,567,288 A * | 10/1996 | Fukutomi | | C30B 23/002 |
| | | | | 204/298.11 |
| 5,911,856 A * | 6/1999 | Suzuki | | C23C 14/0042 |
| | | | | 204/192.27 |
| 5,946,542 A * | 8/1999 | Iyer | | H01L 21/02274 |
| | | | | 438/786 |
| 6,338,775 B1 * | 1/2002 | Chen | | C23C 14/547 |
| | | | | 427/9 |
| 6,621,121 B2 * | 9/2003 | Baliga | | H01L 29/8725 |
| | | | | 257/329 |
| 6,809,876 B2 * | 10/2004 | Taki | | G02B 1/115 |
| | | | | 359/796 |
| 7,033,679 B2 * | 4/2006 | Okura | | C23C 14/081 |
| | | | | 428/673 |
| 7,098,615 B2 * | 8/2006 | Swenson | | H05H 9/00 |
| | | | | 315/505 |
| 7,445,733 B2 * | 11/2008 | Arakawa | | H01J 29/896 |
| | | | | 359/900 |
| 7,994,472 B2 * | 8/2011 | Plettner | | H05H 7/06 |
| | | | | 250/306 |
| 8,110,794 B2 * | 2/2012 | Miller | | H01J 49/0463 |
| | | | | 250/281 |
| 8,182,861 B2 * | 5/2012 | Lee | | C23C 16/52 |
| | | | | 427/9 |
| 8,804,911 B2 * | 8/2014 | Toyokawa | | G01N 23/223 |
| | | | | 378/68 |
| 9,024,256 B2 * | 5/2015 | Ruan | | H01J 37/228 |
| | | | | 250/311 |
| 9,053,833 B2 * | 6/2015 | Plettner | | G21K 5/04 |
| 9,188,544 B2 * | 11/2015 | Delgado | | G01N 21/9501 |
| 9,214,782 B2 * | 12/2015 | Solgaard | | H01S 3/0903 |
| 10,440,810 B2 * | 10/2019 | Lal | | H05H 9/045 |
| 10,566,169 B1 * | 2/2020 | Bennahmias | | H01J 49/34 |
| 10,784,175 B2 * | 9/2020 | Clark | | H01L 22/20 |
| 10,852,492 B1 * | 12/2020 | Vermeulen | | G02B 6/423 |
| 10,964,608 B2 * | 3/2021 | Clark | | H01L 22/20 |
| 11,121,271 B2 * | 9/2021 | Wang | | H01L 31/035281 |
| 11,605,522 B1 * | 3/2023 | Bennahmias | | H01J 25/36 |
| 2003/0227670 A1 * | 12/2003 | Taki | | G02B 1/02 |
| | | | | 359/355 |
| 2006/0144335 A1 * | 7/2006 | Lee | | C23C 16/52 |
| | | | | 156/345.24 |
| 2009/0224700 A1 | 9/2009 | Chen et al. | | |
| 2009/0294836 A1 * | 12/2009 | Kiyotoshi | | H10B 43/40 |
| | | | | 257/E21.409 |
| 2009/0314949 A1 * | 12/2009 | Plettner | | H05H 7/06 |
| | | | | 250/397 |
| 2010/0213367 A1 * | 8/2010 | Miller | | G01N 1/405 |
| | | | | 436/175 |
| 2011/0027459 A1 * | 2/2011 | Lee | | C23C 14/547 |
| | | | | 118/712 |
| 2013/0038248 A1 * | 2/2013 | Yamamoto | | H05H 9/042 |
| | | | | 315/505 |
| 2014/0070732 A1 * | 3/2014 | Solgaard | | H05H 15/00 |
| | | | | 315/500 |
| 2019/0177834 A1 * | 6/2019 | Benetti | | H01L 21/02631 |
| 2019/0295904 A1 * | 9/2019 | Clark | | H01L 22/20 |
| 2019/0295905 A1 * | 9/2019 | Clark | | H01L 21/67184 |
| 2022/0039247 A1 * | 2/2022 | Niedermayer | | H05H 9/04 |
| 2022/0352685 A1 * | 11/2022 | Huang | | H01S 3/0407 |

FOREIGN PATENT DOCUMENTS

| | | | |
|---|---|---|---|
| GB | 2175741 A * | 12/1986 | H01J 37/3171 |
| WO | WO-2008156896 A2 * | 12/2008 | H01J 35/14 |

* cited by examiner

APPARATUS AND METHOD FOR GUIDING CHARGED PARTICLES

RELATED APPLICATIONS

This application claims priority to German Patent Application No. 10202011987.2 filed Jul. 28, 2020, which application is incorporated herein by reference.

The present invention relates to an apparatus for guiding charged particles in a corpuscular ray, to a method for producing a channel for guiding charged particles, to a method for guiding charged particles in the channel, and, in particular, to acceleration and three-dimensional focusing of an electron beam in a device layer of a silicon-on-insulator nanostructure by means of vertical laser irradiation with a possibility of lateral diversion of lost electrons.

BACKGROUND

Electrically charged particles in a corpuscular ray can be guided by widening and narrowing in an inhomogeneous channel by means of an electromagnetic alternating field; the particles in the channel can in particular be accelerated and focused. In order to guide the particles, a spatial variation of the periodically alternating electric field strength is coordinated with a position of the particles or the particle bunches in the channel. The spatial variation of the field strength is brought about by means of the inhomogeneity of the channel. The required high precision of the coordination can be achieved by nanofabrication. Methods with these features are grouped under the broad term of dielectric laser acceleration (DLA). The term "Glasbeschleuniger" [glass accelerator] is also used in German.

In the patent literature, it is known in particular to introduce laser light into the channel through an inhomogeneous boundary of the channel. For example, patent DE 10 2015 116 788 B3 discloses a method and an apparatus for the (energy) modulation of a corpuscular ray in a channel. An apparatus for accelerating electrons according to this method which is directed to a medical application is disclosed in CA 268 1824 A1. Some further embodiments for the inhomogeneous channel boundary are provided by patent US 2009 314 949 A1. In addition, US 2014 070 732 A1 shows, for example, that the inhomogeneity does not have to directly affect a cross section of the channel, but can occur within the channel boundary.

When guiding the particles, in addition to the acceleration, great importance is placed on the focusing, i.e. an aligning correction of the particle in its motional phase space. Since, for physical reasons, it is not possible to generate an electromagnetic field configuration in space that could stabilize a charged particle in all spatial directions at the same time, fields which focus the particles in directions that change over time are generally generated. A method known for this purpose from the specialist literature as alternating-phase focusing (APF) uses a switching of positions of the particles or the particle bunches with respect to a phase of the electromagnetic alternating field that is stationary in the rest frame of the particles. The particle alternates regularly between a position that is stable with respect to the focusing in its flight direction and an unstable position, and at the same time between a position that is correspondingly unstable with respect to a direction perpendicular to its flight direction and a stable position.

For generating electromagnetic fields for the purpose of the focused transport of charged particles in the channel, symmetrical boundary conditions can be important. In this context, a channel with a cross-section that is effectively only delimited by two mutually opposite sides for laser light has proven advantageous, in particular for forming a focusing field profile. In known examples, such a configuration is implemented by attaching delimiting elements that serve as acceleration and focusing elements. In particular, this can be achieved by a refractive index contrast, i.e. two materials with high and low optical density. The acceleration elements can consist of an optically dense material and be attached to a base made of optically thin material. The laser light can enter this optically thin material with only very little reflection.

For the miniaturization of such apparatuses for guiding charged particles, experimental arrangements in semiconductor structures have hitherto existed. So-called silicon-on-insulator (SOI) wafers are used, which have a sequence consisting of e.g. a silicon-containing layer (device layer, optically dense and electrically conductive) and an optically thin and electrically insulating layer (cladding), e.g. made of silicon dioxide, over a substrate which often also contains silicon. The channel is formed in the silicon layer of the device layer, for example using photolithography or electron beam lithography methods and by etching. The channel then has a boundary formed by the optically thin insulation layer and by silicon structures of the device layer. In particular, for focusing according to the APF method, two laser beams are injected into the channel at the same time through the mutually opposite silicon boundaries of the channel in such apparatuses. For this purpose, structures must also be formed in the insulation layer, which are also produced by etching.

Despite the focusing, particles can be lost from the ray, for example through non-linear effects. Such stray particles can severely disrupt the stability of the corpuscular ray due to the Coulomb interaction. This poses a problem, in particular for the aforementioned apparatuses, because groundings of the silicon structures delimiting the channel cannot easily be attached: Grounding paths in the direction of the incident laser beams interfere with the approach of the laser light; grounding paths through the optically thin, electrically insulating layer are technically complex and disrupt the symmetry achieved by said layer. Another difficulty, in particular with the existing apparatuses using the APF method, is the precisely coordinated injection of the two laser beams through the sides of the channel, which laser beams must arrive in phase (i.e. at the same time with deviations of less than one femtosecond) to generate a symmetrical field. The necessary etching not only of the silicon but also, in particular, of the insulation layer for this purpose is technically complex and economically inefficient. The scattering of electrons and the fine-tuning of two laser beams also hinder efficient miniaturization of such apparatuses.

There is thus a need for an apparatus for guiding charged particles that can be length-scaled more efficiently.

BRIEF DESCRIPTION OF THE INVENTION

This aim is at least partially achieved by an apparatus according to claim 1, a particle accelerator according to claim 7, a method according to claim 8, and a method according to claim 9. The dependent claims relate to advantageous developments of the apparatus according to claim 1.

The present invention relates to an apparatus for guiding (in particular focusing and accelerating) charged particles. The apparatus comprises a substrate with a surface, a layer with a low optical density or with a low refractive index on the surface, and an inhomogeneous channel which is delimited by two mutually opposite delimiting structures. The channel is formed on a side of the layer opposite the surface of the substrate. The channel optionally comprises grounding paths, which are also formed on the side of the layer opposite the substrate and outside the channel. The apparatus further comprises a radiation device which is designed to generate at least one pulsed laser beam and to inject said beam into the channel from a side that is opposite the layer. The layer, for the at least one laser beam, is optically thin, i.e. has a low refractive index, and the delimiting structures have a high optical density compared with the layer. The delimiting structures are optionally connected to at least one grounding path in each case in order to divert particles escaping from the channel into the delimiting structures away from the channel. The inhomogeneous channel is designed to guide the particles by means of the laser beam in the channel, and to alternatingly focus them along the channel and in at least one direction perpendicular to the channel.

The particles can in particular be electrons. The substrate and the optically thin layer can in particular be parts of a nanostructure such as, for example, an SOI wafer and, for example, comprise silicon (high refractive index) or silicon dioxide (low refractive index). The layer is then also electrically insulating. The channel is delimited on one side by the optically thin layer.

The delimiting structures forming the channel are made of an optically denser material than the layer; a high contrast, i.e. a difference in optical density or in refractive indexes, between the delimiting structures and the layer is advantageous. The delimiting structures can be continuous or composed of a large number of individual elements.

Particularly when the channel cross section narrows, particles scattered from their intended trajectory can strike the delimiting structures and disrupt the functionality of the apparatus through electrostatic forces. This disturbance can be prevented by diversion. If the channel has grounding paths for this purpose, they can be only weakly conductive and thus advantageously be produced in one step with the delimiting structures. The grounding paths can in particular consist of the same material as the delimiting structures; the material can in particular comprise silicon. Metals can be completely avoided because of their low laser damage threshold. In embodiments, the grounding paths only contain a material that is more conductive than the optically thin, electrically insulating layer. For example, silicon can already be sufficiently conductive for an impacting particle to prevent charging. The material of the delimiting structures and/or the grounding paths can also comprise semiconducting silicon, for example by means of (homogeneous or inhomogeneous) doping with e.g. antimony or aluminum. The possibility of lateral diversion of particles scattered from the channel is a direct consequence of injecting the laser beam from a direction other than the channel wall direction.

The radiation device generates repeated, time-limited laser light pulses which form the at least one pulsed laser beam. A pulse duration is advantageously coordinated with a repetition rate of spatially separated particle bunches which are formed by the particles. In particular, the particle source can also be operated by the laser. The pulse duration is advantageously so short that a second reflection from a side of the substrate opposite the surface of the substrate arrives in the channel offset in time in such a way that the particles are no longer disturbed by this second reflection.

The reflection from the opposite side of the substrate can also be completely prevented by means of an anti-reflective coating.

The radiation device does not inject the at least one laser beam laterally or along the optically thin layer into the channel, but at an angle from a side of the channel opposite the optically thin layer. The angle can in particular be 90 degrees; the radiation device can thus be designed to radiate at least one laser beam perpendicularly onto the electrically insulating layer delimiting the channel. The channel also has walls or other delimiting structures that narrow and widen the channel cross section in spatial variation. This inhomogeneity of the channel represents boundary conditions for the electromagnetic oscillation field which are such that the electromagnetic oscillation field guides particles entering the channel, i.e. in particular accelerates and/or transports them along the channel, and also focuses them alternatingly. The length of the channel can be chosen as desired, so a considerable acceleration can be achieved over a longer distance, the corpuscular ray being trapped transversely by the alternating focusing. Alternating is intended to mean that the focusing changes in different directions in the temporal sequence or spatial sequence in the longitudinal direction of the channel. The acceleration can take place according to the known DLA method. The alternating focusing can take place in particular according to the APF method.

Optionally, the delimiting structures of the channel include a plurality of acceleration elements which are arranged quasi-periodically in order to achieve focusing via a non-homogeneous phase relation. In particular, the acceleration elements can be attached in two rows on the electrically insulating layer and thereby delimit the channel. The acceleration elements are free-standing, i.e. they are interconnected only by the optically thin layer, at least in the vicinity of the channel. The acceleration elements can form individual cells, each comprising two acceleration elements through which the particles are passed. The base surfaces of the acceleration elements can be delimited by shapes such as ellipses, triangles, or U-shapes, it being advantageous for corners to be rounded off to avoid field magnification. Distances between the acceleration elements of a delimiting structure are designed in such a way that the particles are directed and alternatingly focused. For this purpose, the distances between the acceleration elements of a delimiting structure are different; in particular, there are jumps in the sequence of the distances that cause the position of the particles to change with respect to a phase of the electromagnetic alternating field and thus enable a flexible design of the particle dynamics according to the physical principles of alternating phase focusing (APF).

In particular, in a simple case, the APF method leads to a focusing of the particles alternatingly in a direction along the channel, or in the direction of a corpuscular ray formed by the particles, and in a spatial direction perpendicular thereto. In such cases, for example, magnets attached outside the channel (such as quadrupole magnets) can be used in order to focus the particles in another direction perpendicular to the channel. However, in a development of the APF method, it is known to use suitable acceleration elements to achieve focusing in another direction perpendicular to the channel solely by means of the electromagnetic alternating field of the beamed laser beams. A combination of this form of focusing in all three spatial directions with injecting in particular a single laser beam into the channel favors miniaturization of the apparatus.

Optionally, the delimiting structures comprise a plurality of grounding paths, and the acceleration elements are each electrically connected to a separate grounding path in order to divert particles escaping from the channel into the respective acceleration element away from the channel.

Optionally, at least one acceleration element has an elliptically delimited base surface. In contrast to acceleration elements with sharp edges, elliptically delimited base surfaces result in a smooth electromagnetic alternating field. In particular, the acceleration elements can be elliptical cylinders (cylinders with an elliptically delimited base surface). The elliptical cylinders form periodic or quasi-periodic individual cells. The elliptical cylinders can in particular be pillars arranged in pairs, so that the electromagnetic alternating field guides the particles through a gap between the pillars of a pair; the gap represents a narrowing of the channel.

Optionally, the electrically insulating layer comprises silicon dioxide, and the substrate and the delimiting structures each comprise silicon. In particular, the silicon can also be doped. In addition, the surface can be designed to reflect the at least one beamed laser beam, and thereby to generate a symmetrical alternating field in the channel and thus guide the particles.

Silicon dioxide is a significantly worse conductor than silicon. Due to its transparency, silicon dioxide favors the symmetry of the alternating field as formed by the elliptical cylinder and the reflection on the substrate. The surface of the substrate is (partially) reflective, in particular for light in the wavelength range of the laser beam. The reflection of the laser beam causes a local symmetrization of an electromagnetic quadrupole oscillation field generated by the reflection and the laser beam in the channel. A total reflection of the laser beam on the surface of the substrate is not necessary here.

Optionally, the radiation device is designed to generate only one pulsed laser beam and inject it into the channel from a side that is opposite the optically thin layer. The radiation device advantageously radiates the laser beam into the channel at an angle of 90° toward the surface of the substrate. The wavelength of the laser can be adapted to a period length in the arrangement of the acceleration elements or in an arrangement of the individual cells formed by the acceleration elements in order to enable acceleration. In contrast, embodiments in which two laser beams radiate into the channel provide two injection directions inclined relative to the electrically insulating layer, each at an angle of 45°, for example.

Embodiments further relate to a particle accelerator comprising an apparatus of the type described above, the charged particles being in particular electrons and the radiation device having an optical system to shape the pulsed laser beam and direct it perpendicularly or obliquely onto the surface of the substrate.

The shaping of the laser beam should be understood in terms of the shape of its pulses. The pulses have inclined and/or spatially curved fronts in their intensity distribution, which is suitable for guiding the particles in the channel and focusing them alternatingly at the same time. Production of such pulse shapes is mentioned in the specialist literature on DLA in particular.

Embodiments also relate to a method for producing an apparatus for guiding charged particles. The apparatus comprises a substrate having a surface, an optically thin layer formed on the surface, an inhomogeneous channel formed by two mutually opposite delimiting structures on a side of the layer that is opposite the substrate, and a radiation device which is designed to generate at least one pulsed laser beam and inject said beam into the channel from a side that is opposite the electrically insulating layer. The method comprises the steps of:

providing a structure, in particular a micro- or nanostructure, comprising a sequence consisting of an upper, optically dense layer (e.g. silicon) to be etched, the optically thin layer, and the substrate, the optically thin layer having a lower refractive index in comparison with the etching layer (the layer to be etched);

etching only the etching layer, thereby forming the channel or the delimiting structures and the grounding paths.

The structure can in particular be an SOI wafer. The etching can be part of a photolithography or electron beam lithography method for forming the channel in a silicon layer of an SOI wafer, for example with silicon dioxide as the electrically insulating layer. In particular, the method of production advantageously does not require etching of the optically thin layer.

Embodiments also relate to a method for guiding charged particles in an apparatus for guiding charged particles. The apparatus comprises a substrate having a surface, an optically thin layer formed on the surface, an inhomogeneous channel formed by two mutually opposite delimiting structures on a side of the layer that is opposite the substrate, and a radiation device which is designed to generate at least one pulsed laser beam and inject said beam into the channel from a side that is opposite the electrically insulating layer. The method comprises the steps of:

injecting the at least one pulsed laser beam into the channel from a side that is opposite the optically thin layer; thereby guiding, in particular accelerating, the particles in the channel; and alternatingly focusing the particles along the channel and in at least one direction perpendicular to a direction of the channel.

The acceleration in the channel can be carried out using a DLA method. Focusing and guiding can be carried out using an APF method. The focusing method preferably results alternatingly in focusing both in the direction of the channel and in two mutually independent directions perpendicular to the direction of the channel or in all three spatial directions.

Embodiments of the present invention provide the following advantages over previous apparatuses for guiding charged particles. The apparatus significantly facilitates implementation, in particular of an electron accelerator, on a microchip. The acceleration of electrons with high gradients in microstructures requires a focusing pattern, and, in particular for APF methods, laser-driven electron accelerators on a microchip are known which, however, require laser illumination from two sides to generate a symmetrical electromagnetic alternating field in the channel. Furthermore, a very complex lithographic production method for the structures on the microchip is required for these apparatuses. The SOI wafers used in this case must be etched both in the topmost layer (device layer) and in a second step in the insulator layer (cladding) containing glass ($SiO_2$). Lateral laser beam injection requires perfect symmetry of the two laser beams (exactly the same phase) and two etching steps in the production of the structure, the second step in particular (etching the cladding layer) being very complex. Furthermore, due to the lateral injection it is not possible to ground the topmost layer in order to divert electrons lost from the corpuscular ray. The charging of the structures could be prevented by vapor deposition of an extremely thin metal layer, but the use of metal lowers a damage threshold and thus limits the amplitude of the laser beams to an extent that is clearly disadvantageous. However, it is difficult to generate the symmetrical focusing fields that are required for a length-scalable accelerator with electron confinement based on the APF method in pure silicon structures. Known attempts at reduction to a single laterally incident laser beam have so far been unsuccessful, in particular with regard to generating a sufficiently symmetrical electromagnetic field in the channel.

In contrast, embodiments of the present apparatus represent a simple implementation of the APF focusing pattern achieved by generating the required focusing and acceleration fields by means of the structure of the channel described, in particular with pairs of pillars each forming a cell, and by means of the at least one laser beam beamed into the channel from a side that is opposite the electrically insulating layers, in particular vertically. By illuminating the structures from above in this way, instead of from both sides, not only can one optical branch be eliminated, all of the above-mentioned problems can also be solved at the same time. The laser fields that are used to focus and accelerate the electrons are inherently horizontally symmetrical and are vertically symmetrized by the reflection from the silicon surface of the substrate. Because of the short laser pulses used, reflection from the underside of the substrate is negligible. Embodiments of the present apparatus thus represent a considerable simplification of the technical design, since only a single laser beam is required and the optical system can thus be miniaturized. Furthermore, by beaming into the channel from a side of the channel opposite the electrically insulating layer, the chip production can also be simplified, since only the topmost layer of the apparatus (the device layer) has to be manufactured by means of e.g. photolithography or electron beam lithography. For SOI wafers, this is a standard method that is used in many nanophotonic applications. The significantly more complex lithography step to etch the underlying glass layer (the cladding) is no longer necessary. Since the outer lateral ends of the in particular elliptical pillars are now available as free space, grounding paths, or conductor tracks, which are designed to divert lost electrons to both sides individually for each acceleration cell and thus prevent electrostatic charging of the structure, can also be produced on the electrically insulating layer or in the device layer. These conductor tracks do not directly interconnect the individual pillars. In this way, individual cells of the channel comprising a pair of pillars remain independent of one another for the laser fields, which is a decisive advantage for the laser phase-dependent APF focusing pattern (higher bandwidth). The design to be patented therefore allows the lost electrons to be diverted without coupling the individual cells directly, which then enables the phase jumps used for focusing in the APF method through short drift distances between the cells. The electron beam dynamics are therefore only marginally influenced by the conductor tracks.

Using embodiments of the present apparatus, it is therefore possible for the first time to generate symmetrical synchronous fields with just a single laser beam in both transverse axes in nanostructures by means of which electrons in dielectric microstructures can be accelerated over distances of any length. Furthermore, lost electrons can be effectively diverted without the necessary connections or conductor tracks negatively affecting the quality of the laser fields.

Laser-driven electron accelerators can therefore be constructed as embodiments of the present apparatus on microchips which are significantly smaller than their previously known conventional counterparts. Such a miniaturized electron accelerator can be manufactured inexpensively and easily and distributed in large quantities. Applications are, for example, in electron microscopy and diffraction, which is a crucial tool for research on macromolecules (physics/chemistry/biology).

BRIEF DESCRIPTION OF THE DRAWINGS

The embodiments of the present invention will be better understood from the following detailed description and the accompanying drawings of the various embodiments, which should not, however, be interpreted as limiting to the disclosure of the specific embodiments, but only serve the purpose of explanation and understanding.

DETAILED DESCRIPTION

Figure 1:
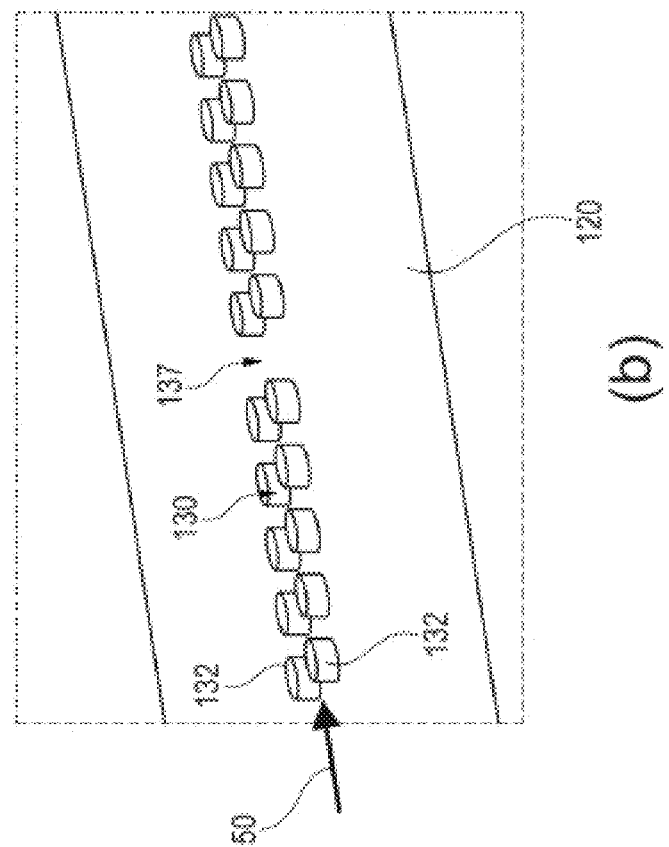
FIG. 1 shows two views of an embodiment of an apparatus for guiding charged particles according to the present invention.
Figure 1:
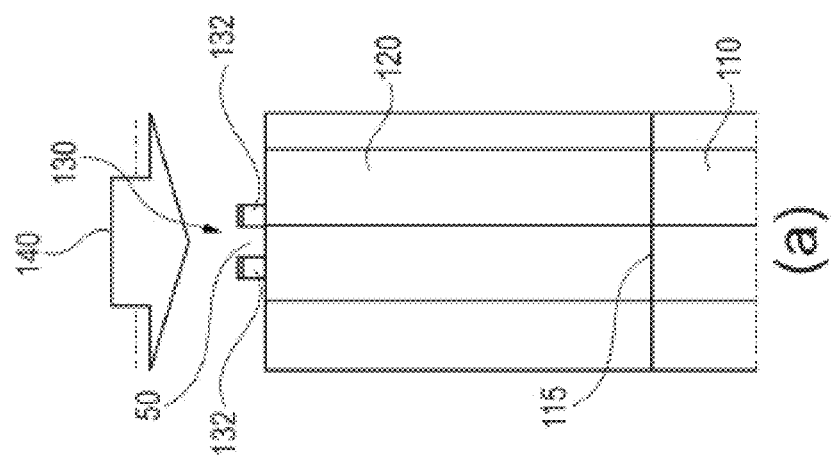

FIG. 1 shows two views a, b of an embodiment of an apparatus for guiding charged particles 50 according to the present invention. View a on the left of the figure shows a cross section through a substrate 110 with a reflective surface 115. An optically thin and electrically insulating layer 120 is formed on the surface 115. Furthermore, an inhomogeneous channel 130 can be seen in cross section, which is formed on a side of the electrically insulating layer 120 that is opposite the substrate 110. The channel 130 is formed by two delimiting structures, each of which is designed here as a row of elliptical cylinders as acceleration elements 132. Grounding lines for the delimiting structures are not shown in this figure. Also not shown is a radiation device that generates a pulsed laser beam 140, for which a direction of incidence is indicated by a vertical arrow. The laser beam 140 radiates into the channel from a side that is opposite the electrically insulating layer 120, and here in particular vertically, onto the optically thin layer 120. The laser beam 140 penetrates the optically thin layer 120. The surface 115 brings about a (partial) reflection of the laser beam 140, and the channel 130 is designed in such a way that the laser beam 140 and the reflection in the channel 130 produce an electromagnetic alternating field which, in view a, guides, i.e. in particular directs and/or accelerates, the particles 50 with a flight direction that runs vertically onto the cross-sectional plane shown. In addition, the channel 130 is designed such that the electromagnetic alternating field is suitable for alternatingly focusing the particles 50 in the direction of the channel 130 and in at least one direction perpendicular to the channel 130 (for example orthogonally to the direction of incidence of the laser beam 140 and to the direction of the channel 130).

View b on the right of the figure shows a perspective view of the channel 130. In the present embodiment, the channel 130 is delimited or formed on the optically thin layer 120 by the large number of acceleration elements 132 which comprise silicon and have an elliptical base surface. The acceleration elements 132 form a delimitation of the channel 130 by their arrangement in two rows, with two acceleration elements 132 facing each other in pairs. There is a refractive index contrast between the acceleration elements 132 and the optically thin layer 120, i.e. said elements have a higher optical density or a higher refractive index than the layer 120. A difference in a refractive index of the acceleration elements 132 and a refractive index of the layer 120 can be of a factor of 1.5 or more. The distances between the acceleration elements 132 are adapted to a speed of the particles 50 along the channel 130; the length of the individual cell $\lambda_g = \beta\lambda$ (for example the distance between two acceleration elements 132 in a row) is determined by the relative speed $\beta = v/c$ of the particle speed v in relation to the speed of light c and by a wavelength $\lambda$ of the injected laser light 140.

Deviations 137 of the acceleration elements 132 from distances on the order of magnitude $\lambda_g$ cause jumps in the phase of laser light 140 for particles 50. The alternating phase focusing pattern APF is implemented in this way. The phase jumps for particle focusing shape the electron dynamics according to the alternating-phase focusing (APF) method known from the specialist literature.

Figure 2:
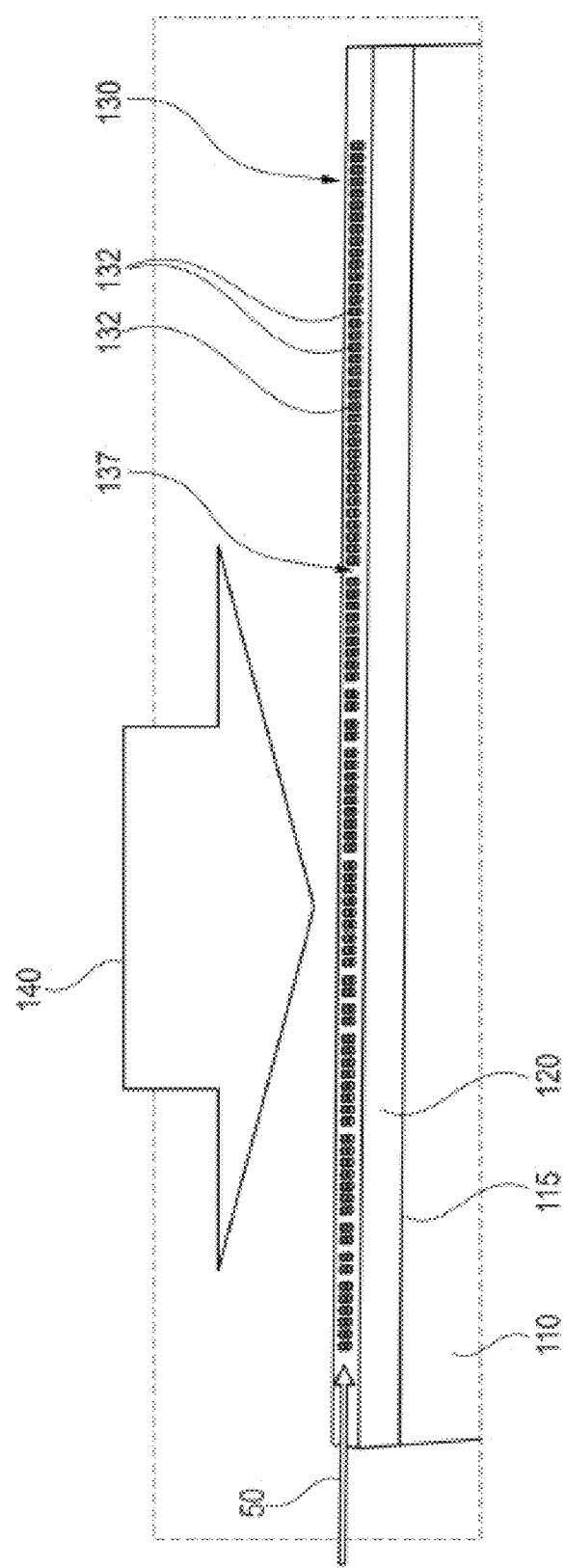
FIG. 2 shows a further view of the embodiment from FIG. 1.

FIG. 2 shows a further view of the embodiment from FIG. 1. A pulse of the injected laser beam 140 is shaped in such a way that it guides the particles 50 in the channel 130 and at the same time forms them into bunches, so that the particle bunches do not disperse and do not strike the delimiting structures or the acceleration elements 132.

As an alternative to the embodiment shown here with only one laser beam 140, a plurality of laser beams can also be used. For example, two laser beams can enter the channel 130 at the same angle, each inclined by 45° with respect to the optically thin layer 120. In this way, an alternative electromagnetic alternating field, which deflects particles in a vertical direction, for example, can also be formed.

Figure 3:
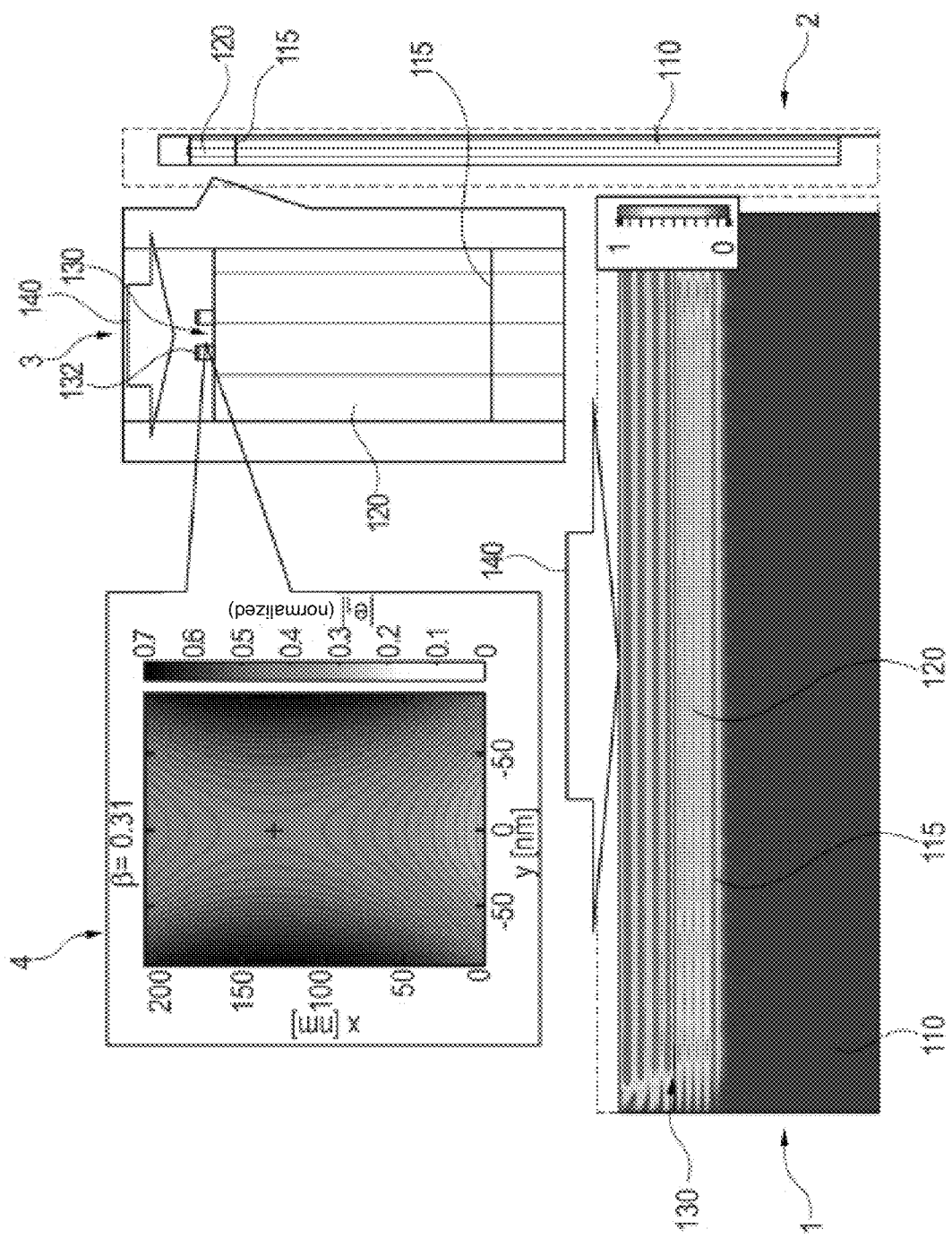
FIG. 3 illustrates further details for the embodiment from FIG. 2.

FIG. 3 shows further details of the embodiment from FIG. 1.

The figure shows, in a part 1, a longitudinal section through the substrate 110, the electrically insulating layer 120, and the channel 130. An electric field strength in the longitudinal direction of a pulse of the laser beam 140 is shown in arbitrary linear units. The pulses of the laser beam 140 penetrate the electrically insulating layer 120 and are in particular at least partially reflected on the surface 115. As a result, the electromagnetic alternating field in the channel 130 is symmetrized in a direction vertical to the insulating layer 120. In the simplest case, the exact shape of the pulses is a plane wave (Gaussian ellipsoid pulse); the fronts of the pulses are optionally matched to the movement of the particles, i.e. tilted in an adapted manner, with the phase fronts remaining parallel to the electron beam axis. The pulses can also have an inhomogeneous intensity distribution in the direction along the channel 130. Methods for generating pulsed laser light with an at least partially adjustable intensity distribution and with inclined pulse fronts in the laser device are known in the specialist literature.

In a part 2, the figure shows a cross section through the substrate 110, the electrically insulating layer 120 and the channel 130 which qualitatively reproduces the thickness ratios. In embodiments, the apparatus is formed in particular on a silicon-on-insulator (SOI) wafer. Such a wafer comprises, for example, an electrically insulating layer 120 (cladding) between two layers of silicon, one of which serves as substrate 110 (bulk) and in the other (device layer) of which the channel 130 is formed by lithographic methods. The device layer or the acceleration elements 132 can be, for example, 220 nm above the insulating layer 120; a thickness of the insulating layer 120 may be approximately 3 μm, and the substrate 110 can have a thickness of approximately 725 μm. A temporal full width at half maximum (FWHM) for pulses of the laser beam 140 can be in the range of approximately 800 to 1000 fs, and can also be somewhat shorter in the case of inclined pulse fronts. Light can take approximately 14 fs to pass through the insulation layer; the laser beam reflected on the surface 115 then re-enters the channel as a reflected beam approximately 28 fs after it has entered the electrically insulating layer. In contrast, light can require around 8.2 ps to pass through the silicon layer of the substrate; a disturbance of the electromagnetic alternating field in the channel by a further reflection on an underside of the substrate 110 thus only reaches the channel well after the laser pulse has decayed and after the electron pulse has passed.

In a part 3, the figure shows an enlarged view of the cross section from part 2 in the region of the electrically insulating layer 120. Two acceleration elements 132 can be seen here which border the channel 130 and form a gap for the particles 50.

In a part 4, the figure shows an example of a section through a synchronous field strength $e_1$ of the electromagnetic alternating field as can be generated by the laser beam 140 and its reflection in the channel 130. The synchronous field strength as a function of the transverse position (x, y) is defined as follows:

$$e_1(x, y) = \frac{1}{\lambda_g} \int_{-\lambda_g/2}^{\lambda_g/2} E_z(x, y, z) e^{i\frac{2\pi z}{\beta\lambda}} dz,$$

where $E_z(x, y, z)$ is the electric field in the direction of the channel at the location z along the channel in the frequency range for a frequency that passes through $c/\lambda$ with the wavelength $\lambda$ and the speed of light c. $\beta = v/c$ is a relative speed of the particles, formed by the particle speed v in relation to the speed of light c.

A cross in a central region of the image represents a point of symmetry of the field strength profile and, at the same time, a central position of the corpuscular ray aligned at a right angle to the plane of the drawing. The horizontal axis shows distances in nm from this position; the vertical axis shows a height in nm above the electrically insulating layer 120. A scale next to the image indicates a size of the field strength, normalized to the incident field strength. The exact shape of the potential profile depends on the nature of the acceleration elements or individual cells 132 and can be adapted to a transverse phase space distribution of the particles 50 at the position of the depicted cross section in the channel.

Figure 4:
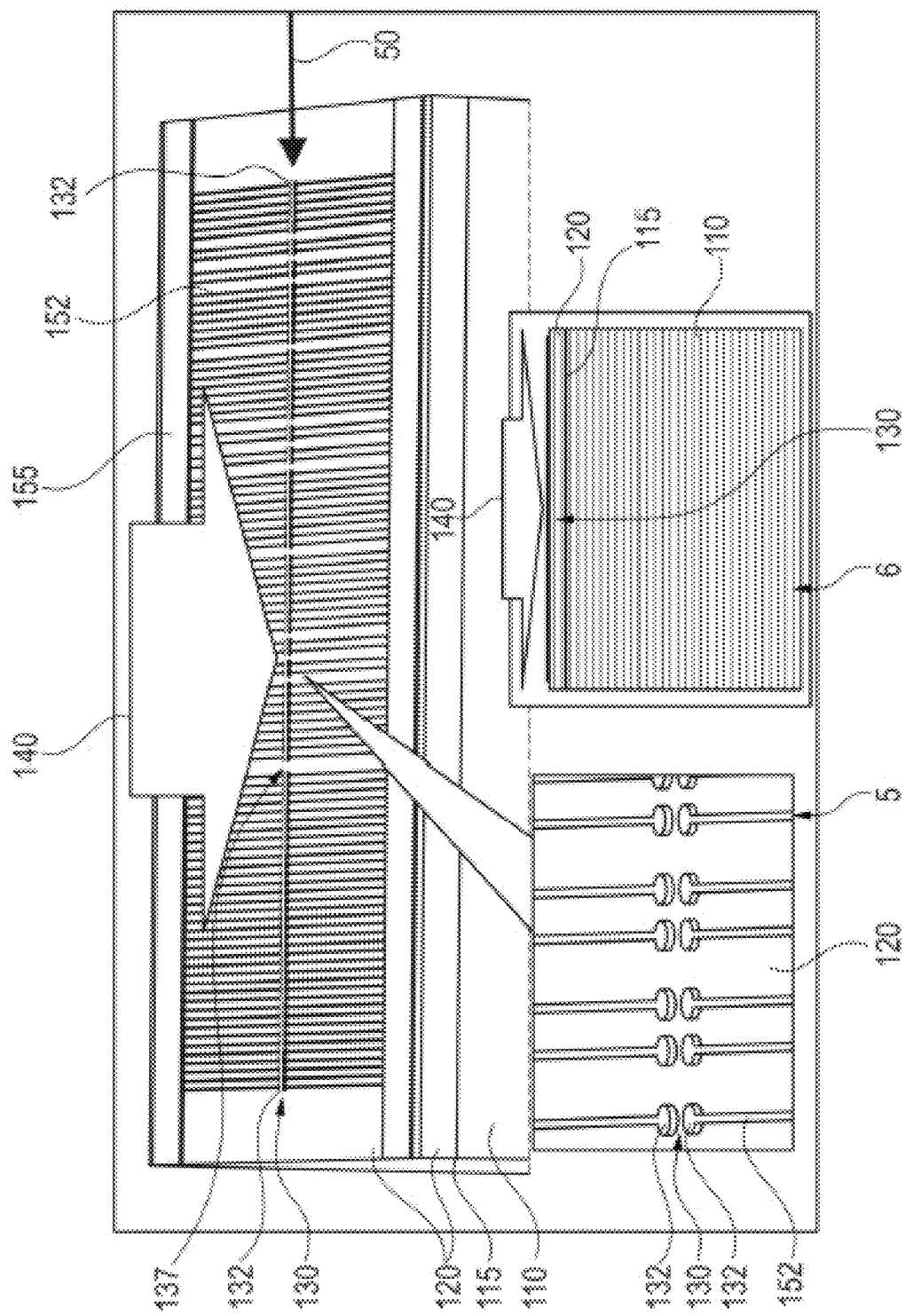
FIG. 4 illustrates the embodiment according to FIG. 1 with grounding paths.

FIG. 4 shows in particular grounding paths 152 in the embodiment from FIG. 1. Each acceleration element 132 is connected to a grounding structure 155 via a separate grounding path 152 and is grounded in this way. The grounding paths 152 are formed on the side of the layer 120 that is opposite the substrate 110 outside the channel 130. The grounding paths 152 are also designed to sufficiently divert particles 50, which have diverged from their trajectory or the channel 130 and strike acceleration elements 132, away from the channel 130. The acceleration elements 132 and, in the embodiment shown, the grounding paths 152 are made of a material that is optically dense for the laser beam 140, while the layer 120 is optically thin and almost transparent for the laser beam. A large optical contrast is advantageous here; the optical density or a refractive index of the acceleration elements 132 can be, for example, higher than the optical density or a refractive index of the layer 120 by a factor of 3 or more. The optically thin layer 120 is also electrically insulating.

An inserted image 5 shows an enlargement of the channel 130 on the electrically insulating layer 120 with acceleration elements 132 and the grounding paths 152 extending therefrom. Another inserted image 6 shows a cross section through the structure with a qualitatively represented thickness ratio of the substrate 110, optically thin layer 120, and structures of the channel 130.

By means of embodiments of the depicted apparatus, scalable and in particular length-scalable accelerators, for example for electrons as particles 50, are implemented which bring about multiplication of the energy e.g. from 20 keV to 60 keV or even to 1 MeV or a corresponding acceleration of the electrons when the length of the channel 130 is less than approximately 2 cm.

Figure 5:
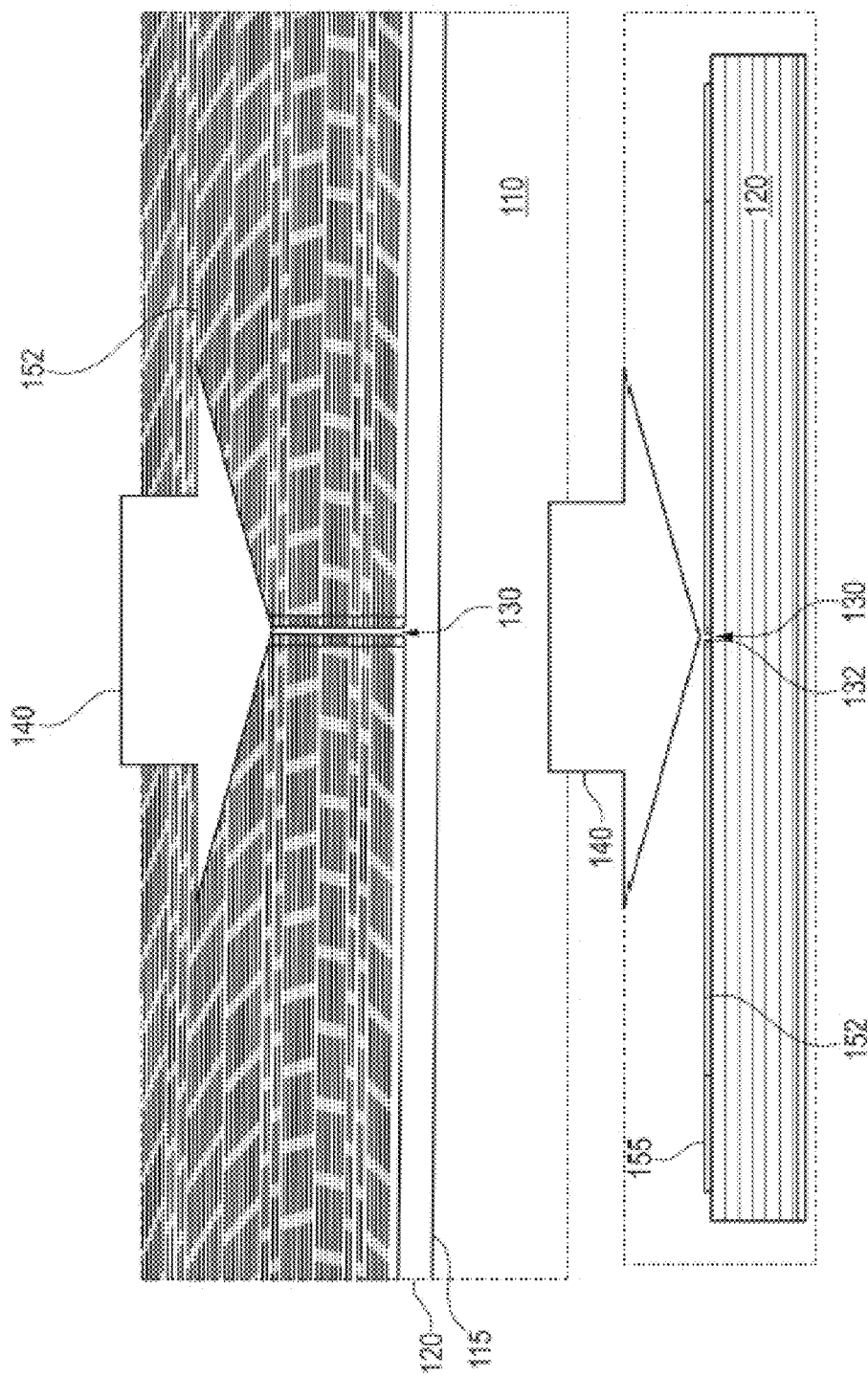
FIG. 5 shows further views of the embodiment according to FIG. 4.

FIG. 5 shows further views of the embodiment from FIG. 4. An upper part of the figure shows a perspective view, in the direction of the channel 130, of the substrate no, the optically thin layer 120, and the structures of the channel 130 with the grounding paths 152. A lower part of the figure shows a detail of the cross section from the inserted image 6 in FIG. 3 in an enlarged view. This part shows the optically thin layer 120 and the structures of the channel 130 thereon with acceleration and focusing elements 132, grounding paths 152, and the grounding structure 155 for the grounding of the acceleration elements 132 via the grounding paths 152.

Figure 6:
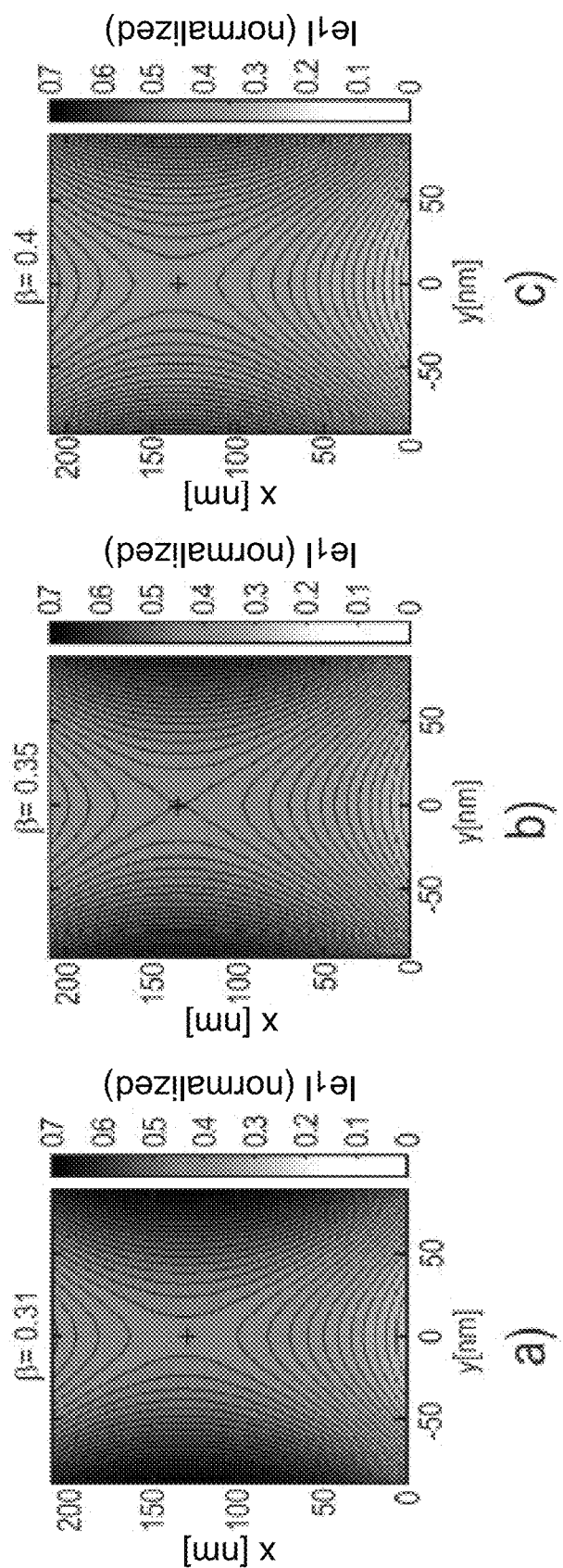
FIG. 6 illustrates a field strength in the cross section of a channel for an embodiment.

FIG. 6 shows three profiles a, b, c for a synchronous field strength $e_1$ of the electromagnetic alternating field in the channel 130 (not shown here) as can be generated by the laser beam 140 and its reflection in the channel 130. A cross in a central region of each of the profiles a, b, c represents a point of symmetry of the respective field strength profile and, at the same time, a central position of the corpuscular ray aligned at a right angle to the plane of the drawing. The horizontal axis shows distances in nm from this position in each case; the vertical axis shows a height in nm above the electrically insulating layer 120 in each case. A scale next to the image in each case indicates the amplitude of the synchronous field strength normalized to the incident laser field strength, which moves a particle 50 in the direction of the cross of the relevant profile and thus alternatingly focuses in all three spatial directions. The three profiles a, b, c correspond to three increasing values of the relative speed $\beta=v/c$ of the particle speed v in relation to the speed of light c. When the particles accelerate along the channel 130, this corresponds to three ascending positions along the channel 130 at the same time. A field strength profile can be calculated for each relative speed $\beta$. A drift of the point of symmetry marked by the cross in one of the depicted profiles can be compensated for by suitable adaptation of the acceleration elements 132, and a variation in the position of the point of symmetry in the cross section along the channel can thereby be prevented or minimized. The exact shape of the field strength profile depends on the nature of the acceleration elements 132 or the individual cells each formed by two acceleration elements 132 and a speed of the particles 50.

Figure 7:
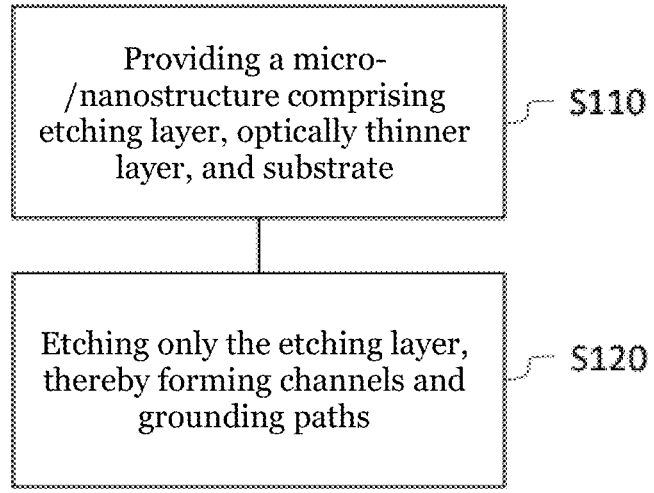
FIG. 7 shows steps of an embodiment of a method for producing an apparatus for guiding charged particles.

FIG. 7 shows steps of a method for producing an apparatus for guiding charged particles 50. The apparatus comprises a substrate 110 having a surface 115, an optically thin layer 120 formed on the surface 115, an inhomogeneous channel 130 which is formed by two mutually opposite delimiting structures on a side of the optically thin layer 120 that is opposite the substrate no, and a radiation device which is designed to generate at least one pulsed laser beam 140 and radiate said beam into the channel 130 from a side that is opposite the optically thin layer 120. The delimiting structures can in particular comprise a large number of acceleration elements 132. A high optical contrast between the delimiting structures or the acceleration elements 132 and the optically thin layer 120 is advantageous here; a refractive index of the acceleration elements 132 can be larger than a refractive index of the layer 120 by a factor of approximately 3. The method includes providing S110 a micro- or nanostructure, such as an SOI wafer, which has a sequence consisting of an etching layer (e.g. a device layer comprising silicon), the optically thin layer 120 (e.g. a cladding comprising glass or silicon dioxide), and the substrate 110 (e.g. a bulk also comprising silicon). Another step of the method includes etching S120 only the etching layer, whereby the channel 130 and the grounding paths 152 are formed.

In particular, the method advantageously does not include etching the optically thin layer 120. The optically thin layer 120 can represent an etch stop layer, i.e. when the upper etching layer is etched, the etching procedure automatically stops at the example oxide layer 120. In embodiments, the etching S120 takes place as a step in a method of photolithography or electron beam lithography; such methods are known in semiconductor technology. In particular, ready-made SOI wafers are already commercially available. This is important for carrying out focusing according to the APF method.

Figure 8:
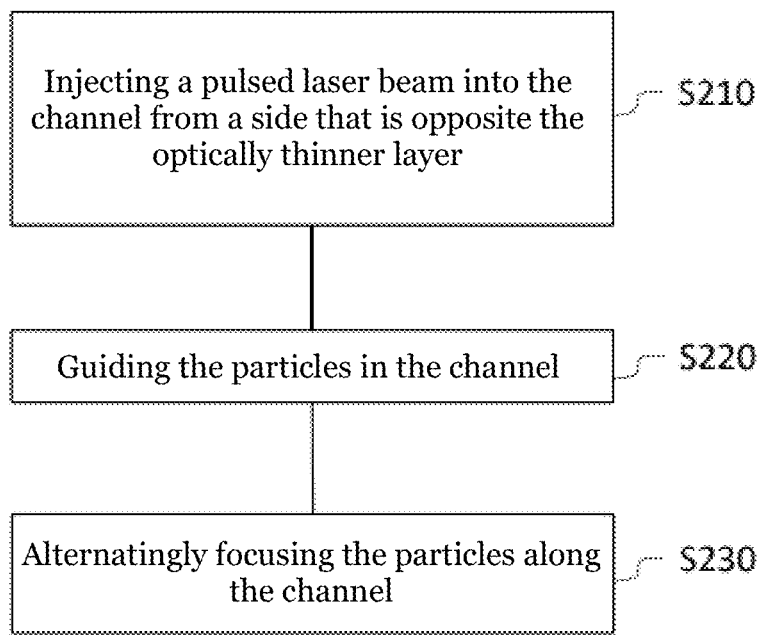
FIG. 8 shows steps of an embodiment of a method for guiding charged particles.

FIG. 8 shows steps of a method for guiding charged particles 50 in a channel 130 of an apparatus for guiding charged particles 50. The apparatus comprises a substrate no having a surface 115, an optically thin layer 120 formed on the surface 115, an inhomogeneous channel 130 which is formed by two mutually opposite delimiting structures on a side of the optically thin layer 120 that is opposite the substrate no, at least two grounding paths 152 formed on the side of the layer 120 that is opposite the substrate no, and a radiation device which is designed to generate at least one pulsed laser beam 140 and inject said beam into the channel 130 from a side that is opposite the optically thinner layer 120. The delimiting structures can in particular comprise a large number of acceleration elements 132. A high optical density contrast between the delimiting structures or the acceleration elements 132 and the optically thin layer 120 is advantageous here; a refractive index of the acceleration elements 132 can be larger than a refractive index of the layer 120 by a factor of approximately 3. The method comprises, as a step, injecting S210 the at least one pulsed laser beam 140 into the channel 130 by means of the radiation device from a side that is opposite the optically thin layer 120, the surface 115 reflecting the laser beam 140. As a result, a quadrupolar synchronous electromagnetic alternating field is formed in the channel 130. A second step comprises guiding S220, i.e. in particular accelerating and/or directing the particles 50 in the channel 130 by means of the electromagnetic alternating field. At the same time, focusing S230, in particular according to the APF method, of the particles 50 alternatingly along the channel 130 and in at least one direction perpendicular to the channel 130 is carried out.

The features of the invention disclosed in the description, the claims and the drawings may be essential for the realization of the invention either individually or in any combination.

LIST OF REFERENCE SIGNS

50 charged particles
110 substrate
115 reflective surface
120 optically thin layer (low refractive index)
130 channel (vacuum)
132 acceleration and focusing element (optically dense, high refractive index)
137 deviation at regular (periodic or quasi-periodic) distances of the limiting elements to cause a phase jump
140 pulsed laser beam
152 grounding path (electrically conductive, e.g. same material as 132)
155 grounding structure (electrically conductive, e.g. same material as 132)
S110, S120 steps of a method for producing an apparatus for guiding charged particles
S210, S220, S230 steps of a method for guiding charged particles

The invention claimed is:

1. An apparatus for guiding charged particles, comprising a substrate having a surface;
   a layer on the surface;
   an inhomogeneous channel formed by two mutually opposite delimiting structures on a side of the layer that is opposite the substrate;
   a radiation device which is designed to generate at least one pulsed laser beam and inject the at least one pulsed laser beam into the channel from a side that is opposite the layer, wherein the layer, for the at least one laser beam, is optically thin and the surface is partially reflective, such that the surface brings about an at least partial reflection of the at least one laser beam for guiding the charged particles, wherein the delimiting structures have a high optical density in comparison with the layer,
   and wherein the delimiting structures are designed to guide the particles by means of the at least one laser beam in the channel and thereby alternatingly focus them along the channel and in at least one direction perpendicular to the channel.

2. The apparatus according to claim 1, wherein the two delimiting structures of the channel comprise a plurality of acceleration elements which are arranged quasi-periodically in order to achieve focusing via a non-homogeneous phase relation.

3. The apparatus according to claim 2, wherein the delimiting structures comprise a plurality of grounding paths, and the acceleration elements are each electrically connected to a separate grounding path in order to divert particles escaping from the channel into the relevant acceleration element away from the channel.

4. The apparatus according to claim 2, wherein at least one acceleration element has an elliptical base surface.

5. The apparatus according to claim 2, wherein the layer comprises silicon dioxide and the acceleration elements and the substrate each comprise silicon, and/or wherein the surface is designed to reflect the at least one injected laser beam in order to thereby generate a symmetrical alternating field in the channel and thus guide the particles in the channel.

6. The apparatus according to claim 1, wherein the radiation device is designed to inject only one pulsed laser beam perpendicularly or obliquely into the channel from a side that is opposite the layer in order to generate a focusing field which is symmetrical in two directions transversely to the channel.

7. A particle accelerator comprising an apparatus according to claim 1, wherein the charged particles are in particular electrons and the radiation device has an optical system to shape the at least one pulsed laser beam and direct said beam perpendicularly or obliquely onto the surface.

8. The apparatus of claim 1, wherein a path of the at least one pulsed laser beam is directly into the channel and is unobstructed by the two mutually opposite delimiting structures.

9. The apparatus of claim 1, wherein a path of the at least one pulsed laser beam is directly into the channel from above and at an angle of between 45 degrees and 90 degrees relative to the layer.

10. The apparatus of claim 1, wherein the two mutually opposite delimiting structures are disposed on and extending above a surface of the layer that is opposite the substrate.

11. A method for producing an apparatus for guiding charged particles, comprising a substrate having a surface, a layer formed on the surface, an inhomogeneous channel which is formed by two mutually opposite delimiting structures on a side of the layer that is opposite the substrate, and comprising a radiation device which is designed to generate at least one pulsed laser beam and inject the at least one pulsed laser beam into the channel from a side that is opposite the layer wherein the surface is reflective, such that the surface brings about an at least partial reflection of the at least one laser beam for guiding the charged particles, the method comprising the following steps:
   providing a structure with a sequence consisting of an upper layer, the layer and the substrate, wherein the layer for the laser beam has a small optical density in comparison with the upper layer; and
   etching only the upper layer, thereby forming the delimiting structures of the channel.

12. A method for guiding charged particles in an apparatus for guiding charged particles, the apparatus comprising a substrate having a surface, a layer formed on the surface, an inhomogeneous channel which is formed by two mutually opposite delimiting structures on a side of the layer that is opposite the substrate, and a radiation device which is designed to generate at least one pulsed laser beam and inject the at least one laser beam into the channel from a side that is opposite the layer the method comprising the following steps:
   injecting the at least one laser beam into the channel from a side that is opposite the layer, onto the layer and the surface, wherein the surface brings about a reflection of the at least one laser beam; thereby guiding the particles in the channel; and
   alternatingly focusing the particles along the channel and in at least one direction perpendicular to the channel.

* * * * *

UNITED STATES PATENT AND TRADEMARK OFFICE
CERTIFICATE OF CORRECTION

| | | |
|---|---|---|
| PATENT NO. | : 11,877,379 B2 | Page 1 of 1 |
| APPLICATION NO. | : 17/385270 | |
| DATED | : January 16, 2024 | |
| INVENTOR(S) | : Uwe Niedermayer | |

It is certified that error appears in the above-identified patent and that said Letters Patent is hereby corrected as shown below:

In the Specification

At Column 1, Line 7, delete "10202011987.2" and insert -- 102020119875.2 -- therefor.

Signed and Sealed this
Twentieth Day of February, 2024

Katherine Kelly Vidal
*Director of the United States Patent and Trademark Office*